No. 846,455. PATENTED MAR. 12, 1907.
Z. A. CURTIS.
CUSHIONED TIRE.
APPLICATION FILED FEB. 5, 1906.
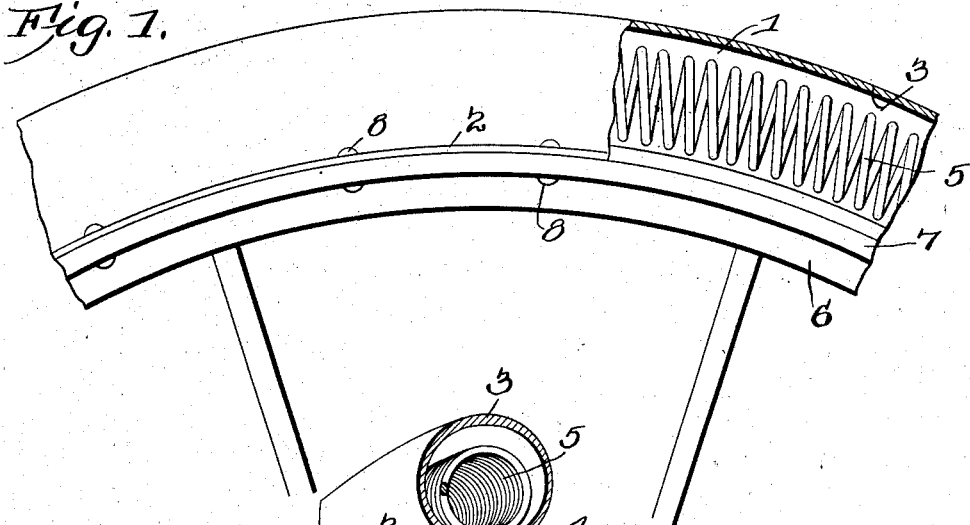
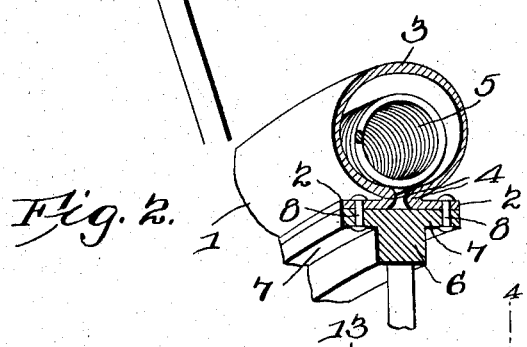
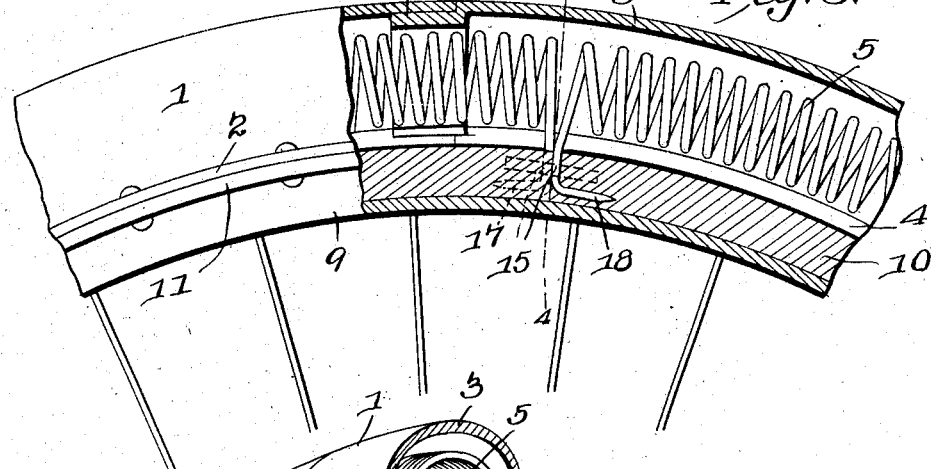
WITNESSES:
Zenas A. Curtis,
INVENTOR.
By
ATTORNEYS

UNITED STATES PATENT OFFICE.

ZENAS ALBERT CURTIS, OF CHANNING, TEXAS.

CUSHIONED TIRE.

No. 846,455.      Specification of Letters Patent.      Patented March 12, 1907.

Application filed February 5, 1906. Serial No. 299,584.

*To all whom it may concern:*

Be it known that I, ZENAS ALBERT CURTIS, a citizen of the United States, residing at Channing, in the county of Hartly and State of Texas, have invented a new and useful Cushioned Tire, of which the following is a specification.

This invention relates to tires for vehicle-wheels, and has for its object to provide for cushioning the same in a new and novel manner so as to obviate the collapsing of the tire by puncturing thereof, as in pneumatic tires.

It is furthermore designed to adapt the tire for light vehicles so as to effectually cushion the same, and also to give the tire the necessary strength to sustain heavily-loaded vehicles and to maintain the desired elasticity of the tire under all conditions.

With these and other objects in view the present invention consists in the combination and arrangement of parts, as will be hereinafter more fully described, shown in the accompanying drawing, and particularly pointed out in the appended claims, it being understood that changes in the form, proportion, size, and minor details may be made within the scope of the claims without departing from the spirit or sacrificing any of the advantages of the invention.

In the drawing, Figure 1 is a side elevation of a portion of a vehicle-wheel equipped with one embodiment of the present invention, parts being broken away to show the interior of the tire. Fig. 2 is a sectional perspective view thereof. Fig. 3 is a view similar to Fig. 1, showing the invention adapted for application to a bicycle-wheel. Fig. 4 is a sectional perspective view on the line 4 4 of Fig. 3.

Similar numerals of reference designate corresponding parts in all of the figures of the drawing.

The present tire includes a substantially tubular elastic sheath 1, formed of spring-plate metal, which is bent into substantially tubular form, the opposite edges of the plate being bent outwardly to form flat annular attaching-flanges 2. The tread portion 3 of the sheath is somewhat thickened, so as to withstand wear, and the plate is also thickened at the bends or folds 4, so as to prevent breaking of the sheath at this point. Between the parts 3 and 4 the opposite sides of the sheath are relatively thin, so as to give the desired elasticity to the tire.

Within the sheath there is a helical spring 5, which is of less diameter than the sheath and lies snugly against the inner periphery thereof, whereby there is a considerable space between the outer periphery of the spring and the tread of the sheath. By this arrangement relatively light vehicles are supported by the sheath alone, which has sufficient elasticity to properly cushion the vehicle. When the vehicle is loaded and traveling over rough roadways, the spring 5 comes into play when the tread of the sheath is compressed sufficiently to engage the spring, whereby the spring prevents collapsing of the sheath and reinforces the same, so as to properly cushion a heavily-weighted vehicle.

When the present tire is applied to a wheel in the original construction thereof, the felly 6 is provided at its outer periphery with opposite annular flanges 7, constituting a broad rim against which the flanges 2 of the sheath lie and are secured by means of suitable fastenings 8, preferably rivets piercing the flanges 2 and 7.

To adapt the invention to bicycle and other wheels having the usual concaved rim, as shown at 9 in Figs. 3 and 4 of the drawing a wooden base 10 is secured to the inner periphery of the tire, the inner edge of the base being convexed so as to snugly fit the concavity of the rim to which it is cemented or otherwise secured. The outer periphery of the base is provided with opposite peripheral flanges 11 to produce a broad outer face for the base, to which the flanges 2 of the tire are secured by means of rivets or other fastenings 12. Furthermore, the base 10 projects beyond one end of the sheath and terminates short of the other end of the sheath, and that end of the sheath which projects beyond the adjacent end of the base is constricted or reduced in diameter, as at 13, (shown in Fig. 3,) so as to fit within the other end of the sheath, and thereby form a lap-joint. That portion of the sheath which projects beyond one end of the base 10 is slit along the bends 4, so as to receive the bends of the opposite end portion of the sheath and permit the flange portions of the projecting end of the sheath to overlap the other ends of the flanges, as shown at 2ª, rivets 14 being passed through the overlapped flange portions and the flange 11 of the base. That end of the tire which has the projecting base portion also has the helical spring projecting to the adjacent end of the base with its extremity extended, as at 15, and lying across the extremity of the base in a groove 16, the extremity of the spring being formed into a lateral prong 17, driven into the end of the base, so as to anchor the spring thereto. The other end of the spring is similarly connected to the adjacent end of the base by means of a prong 18, driven into the base.

It will of course be understood that before the tire is applied to a wheel the ends of the sheath are unconnected, whereby the tire may have its ends separated sufficiently to enable the convenient fitting of the base 9 within the concavity of the rim, after which the ends of the sheath are telescoped and the fastenings 14 are applied.

The ends of the base of course abut, each end being provided with a pin or tenon 19 and a seat or socket 20, so as to engage the complementary members upon the opposite ends of the base, thereby to prevent lateral separation thereof.

Having thus described the invention, what is claimed is—

1. A cushioned tire having outwardly-directed attaching-flanges, an annular base secured to the flanges, a coil-spring having angular ends embedded in the material of said annular base, and a metallic sheath having outwardly-directed flanges secured to said annular base on opposite sides of said coil-spring.

2. A cushioned tire comprising a tubular sheath having one end reduced to fit within the other end, an annular base secured to the inner periphery of the sheath with the inner portion of the base convexed to fit the concavity of a wheel-rim, one end of the base being projected beyond the adjacent end of the sheath, and the other end of the base being terminated short of the adjacent end of the sheath.

3. A cushioned tire comprising a tubular sheath having one end reduced to fit within the other, an annular base secured to the inner periphery of the sheath with the inner periphery of the base shaped to fit the rim of a wheel, that end of the base adjacent the reduced end of the sheath being terminated short of said end of the sheath, the other end of the base being projected beyond the adjacent end of the sheath, and a helical spring contained within the sheath with its ends connected to the respective ends of the base.

4. A cushioned tire comprising a tubular sheath having one end reduced to fit within the other end, a base secured to the inner periphery of the sheath and shaped to fit the rim of a wheel, that end of the base which is adjacent the reduced end of the sheath being terminated short of said end of the sheath, the other end of the base being projected beyond the adjacent end of the sheath, and a helical spring housed within the sheath with its ends lying at the respective ends of the base and formed into prongs driven into said ends of the base.

In testimony that I claim the foregoing as my own I have hereto affixed my signature in the presence of two witnesses.

ZENAS ALBERT CURTIS.

Witnesses:
B. T. WARE,
BELLE BURNS.